(12) United States Patent
Dymond et al.

(10) Patent No.: US 7,875,188 B2
(45) Date of Patent: Jan. 25, 2011

(54) TREATMENT OF AQUEOUS SUSPENSIONS

(75) Inventors: Brian Dymond, Bradford (GB); John Lamperd, Mandurah (AU); Angela Beveridge, Turramurra (AU)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/227,038

(22) PCT Filed: May 4, 2007

(86) PCT No.: PCT/EP2007/054341
§ 371 (c)(1),
(2), (4) Date: May 19, 2009

(87) PCT Pub. No.: WO2007/134957
PCT Pub. Date: Nov. 29, 2007

(65) Prior Publication Data
US 2010/0006510 A1    Jan. 14, 2010

(30) Foreign Application Priority Data
May 19, 2006  (GB) .................. 0610003.6

(51) Int. Cl.
C02F 11/14 (2006.01)
(52) U.S. Cl. .......... 210/710; 210/728; 210/730; 210/731; 210/733; 210/734; 210/737; 405/128.75; 423/121; 423/122
(58) Field of Classification Search .......... 210/710
See application file for complete search history.

(56) References Cited
U.S. PATENT DOCUMENTS

| 3,508,407 A | 4/1970 | Booth ........................... 61/35 |
| 3,681,012 A | 8/1972 | Sibert .......................... 23/143 |
| 4,399,039 A | 8/1983 | Yong .......................... 210/728 |
| 4,506,062 A | 3/1985 | Flesher et al. ................ 526/211 |
| 4,528,321 A | 7/1985 | Allen et al. .................. 524/761 |
| 4,599,379 A | 7/1986 | Flesher et al. ............... 524/801 |
| 4,673,704 A | 6/1987 | Flesher et al. ............... 524/519 |
| 4,720,346 A | 1/1988 | Flesher et al. ............... 210/734 |
| 5,663,123 A | 9/1997 | Goodhue et al. ............ 507/225 |
| 5,788,867 A | 8/1998 | Pearson ...................... 210/733 |

(Continued)

FOREIGN PATENT DOCUMENTS

EP    0 102 760    3/1984

(Continued)

OTHER PUBLICATIONS

Xu Y et al., Mining Engineering, Nov. 2003, pp. 33-39.

(Continued)

Primary Examiner—Peter A Hruskoci
(74) Attorney, Agent, or Firm—Shiela A. Loggins

(57) ABSTRACT

A process in which a suspension comprising dispersed particulate material in an aqueous medium is transferred as a fluid to a deposition area, then allowed to stand and rigidify, and in which rigidification is improved whilst retaining the fluidity of the suspension during transfer, by combining with the suspension during transfer a rigidifying amount of a treatment system which comprises i) a water-soluble synthetic polymer and ii) a water-soluble natural or seminatural polymer. Improved rigidification can be achieved, including dose efficiency especially in regard to the amount of synthetic polymer required. In addition improvements in the clarity of liquor released from the suspension can be achieved.

14 Claims, 1 Drawing Sheet

Slump Height At Centre, c

Slump Height At Edge, e

Radius, r

Slump Angle, % = $\frac{c-e}{r} \times 100$

U.S. PATENT DOCUMENTS

| | | | |
|---|---|---|---|
| 6,001,920 A | 12/1999 | Ghafoor et al. | 524/500 |
| 6,031,037 A | 2/2000 | Ghafoor et al. | 524/388 |
| 6,042,732 A | 3/2000 | Jankowski et al. | 210/727 |
| 6,821,440 B2 * | 11/2004 | Gallagher et al. | 210/732 |
| 2006/0207946 A1 | 9/2006 | McColl et al. | 210/733 |

FOREIGN PATENT DOCUMENTS

| | | |
|---|---|---|
| EP | 0 126 528 | 11/1984 |
| EP | 0 150 933 | 8/1985 |
| EP | 0 170 394 | 2/1986 |
| EP | 0 202 780 | 11/1986 |
| EP | 0 388 108 | 9/1990 |
| EP | 0 905 091 | 3/1999 |
| WO | 94/02567 | 2/1994 |
| WO | 96/05146 | 2/1996 |
| WO | 98/29604 | 7/1998 |
| WO | 98/31748 | 7/1998 |
| WO | 98/31749 | 7/1998 |
| WO | 01/92167 | 12/2001 |
| WO | 2004/060819 | 7/2004 |
| ZA | 6900472 | 3/1968 |

OTHER PUBLICATIONS

English Language abstract AN:1970:32915 of ZA 6900472.

* cited by examiner

Slump Height At Centre, c

Slump Height At Edge, e

Radius, r

Slump Angle, % $= \dfrac{c-e}{r} \times 100$

TREATMENT OF AQUEOUS SUSPENSIONS

The present invention relates to the treatment of suspensions of particulate material, especially waste mineral slurries. The invention is particularly suitable for the disposal of tailings and other waste material resulting from mineral processing and beneficiation processes, including the co-disposal of coarse and fine solids, as a homogenous mixture. By particulate mineral material we include a variety of substrates where mineral material is present. This will include for instance red mud, tailings from a variety of mineral processing operations, and processing of oil sands tailings.

Processes of treating mineral ores in order to extract mineral values will normally result in waste material. Often the waste material consists of an aqueous slurry or sludge comprising particulate mineral material, for instance clay, shale, sand, grit, metal oxides etc admixed with water.

In some cases the waste material such as mine tailings can be conveniently disposed of in an underground mine to form backfill. Generally backfill waste comprises a high proportion of coarse large sized particles together with other smaller sized particles and is pumped into the mine as slurry where it is allowed to dewater leaving the sedimented solids in place. It is common practice to use flocculants to assist this process by flocculating the fine material to increase the rate of sedimentation. However, in this instance, the coarse material will normally sediment at a faster rate than the flocculated fines, resulting in a heterogeneous deposit of coarse and fine solids.

South African patent 6900472 and U.S. Pat. No. 3,508,407 describe a technique that is used to retain fines, especially cement, in an underground mine backfill. Synthetic and copolymers are suggested which can be used alone or together, although no preference is given to using both types.

U.S. Pat. No. 4,399,039 describes the use of starch in dewatering of a settled layer of tailings beneath the surface of a pond where the water migrates upward. The viscosity and variability of the layer is said to be improved in order to support more sand. There is no indication that such a treatment aid would be useful in rigidifying suspension such that a stack may be formed.

For other applications it may not be possible to dispose of the waste in a mine. In these instances, it is common practice to dispose of this material by pumping the aqueous slurry to lagoons, heaps or stacks and allowing it to dewater gradually through the actions of sedimentation, drainage and evaporation.

There is a great deal of environmental pressure to minimise the allocation of new land for disposal purposes and to more effectively use the existing waste areas. One method is to load multiple layers of waste onto an area to thus form higher stacks of waste. However, this presents a difficulty of ensuring that the waste material can only flow over the surface of previously rigidified waste within acceptable boundaries, is allowed to rigidify to form a stack, and that the waste is sufficiently consolidated to support multiple layers of rigidified material, without the risk of collapse or slip. Thus the requirements for providing a waste material with the right sort of characteristics for stacking is altogether different from those required for other forms of disposal, such as back-filling within a relatively enclosed area.

In a typical mineral processing operation, waste solids are separated from solids that contain mineral values in an aqueous process. The aqueous suspension of waste solids often contain clays and other minerals, and are usually referred to as tailings. This is true in a variety of mineral solids including tailings from oil sands. These solids are often concentrated by a flocculation process in a thickener to give a higher density underflow and to recover some of the process water. It is usual to pump the underflow to a surface holding area, often referred to as a tailings pit or dam. Once deposited at this surface holding area, water will continue to be released from the aqueous suspension resulting in further concentration of the solids over a period of time. Once a sufficient volume of water has been collected this is usually pumped back to the mineral processing plant.

The tailings dam is often of limited size in order to minimise the impact on the environment. In addition, providing larger dams can be expensive due to the high costs of earth moving and the building of containment walls. These dams tend to have a gently sloping bottom which allows any water released from the solids to collect in one area and which can then be pumped back to the plant. A problem that frequently occurs is when fine particles of solids are carried away with the run-off water, thus contaminating the water and having a detrimental impact on subsequent uses of the water.

In many mineral processing operations, for instance a mineral sands beneficiation process, it is also common to produce a second waste stream comprising of mainly coarse (>0.1 mm) mineral particles. It is particularly desirable to dispose of the coarse and fine waste particles as a homogeneous mixture as this improves both the mechanical properties of the dewatered solids, greatly reducing the time and the cost eventually required to rehabilitate the land. However, this is not usually possible because even if the coarse waste material is thoroughly mixed into the aqueous suspension of fine waste material prior to deposition in the disposal area, the coarse material will settle much faster than the fine material resulting in banding within the dewatered solids. Furthermore, when the quantity of coarse material to fine material is relatively high, the rapid sedimentation of the coarse material may produce excessive beach angles which promotes the run off of aqueous waste containing high proportions of fine particles, further contaminating the recovered water. As a result, it is often necessary to treat the coarse and fine waste streams separately, and recombine these materials by mechanically re-working, once the dewatering process is complete.

Attempts have been made to overcome all the above problems by treating the feed to the tailings dam using a coagulant or a flocculant to enhance the rate of sedimentation and/or improve the clarity of the released water. However, this has been unsuccessful as these treatments have been applied at conventional doses and this has brought about little or no benefit in either rate of compaction of the fine waste material or clarity of the recovered water.

In the Bayer process for recovery of alumina from bauxite, the bauxite is digested in an aqueous alkaline liquor to form sodium aluminate which is separated from the insoluble residue. This residue consists of both sand, and fine particles of mainly ferric oxide. The aqueous suspension of the latter is known as red mud.

After the primary separation of the sodium aluminate solution from the insoluble residue, the sand (coarse waste) is separated from the red mud. The supernatant liquor is further processed to recover aluminate. The red mud is then washed in a plurality of sequential washing stages, in which the red mud is contacted by a wash liquor and is then flocculated by addition of a flocculating agent. After the final wash stage the red mud slurry is thickened as much as possible and then disposed of. Thickening in the context of this specification means that the solids content of the red mud is increased. The final thickening stage may comprise settlement of flocculated slurry only, or sometimes, includes a filtration step. Alternatively or additionally, the mud may be subjected to prolonged settlement in a lagoon. In any case, this final thickening stage is limited by the requirement to pump the thickened aqueous suspension to the disposal area.

The mud can be disposed of and/or subjected to further drying for subsequent disposal on a mud stacking area. To be suitable for mud stacking the mud should have a high solids content and, when stacked, should not flow but should be relatively rigid in order that the stacking angle should be as high as possible so that the stack takes up as little area as possible for a given volume. The requirement for high solids content conflicts with the requirement for the material to remain pumpable as a fluid, so that even though it may be possible to produce a mud having the desired high solids content for stacking, this may render the mud unpumpable.

The sand fraction removed from the residue is also washed and transferred to the disposal area for separate dewatering and disposal.

EP-A-388108 describes adding a water-absorbent, water-insoluble polymer to a material comprising an aqueous liquid with dispersed particulate solids, such as red mud, prior to pumping and then pumping the material, allowing the material to stand and then allowing it to rigidify and become a stackable solid. The polymer absorbs the aqueous liquid of the slurry which aids the binding of the particulate solids and thus solidification of the material. However this process has the disadvantage that it requires high doses of absorbent polymer in order to achieve adequate solidification. In order to achieve a sufficiently rigidified material it is often necessary to use doses as high as 10 to 20 kilograms per tonne of mud. Although the use of water swellable absorbent polymer to rigidify the material may appear to give an apparent increase in solids, the aqueous liquid is in fact held within the absorbent polymer. This presents the disadvantage that as the aqueous liquid has not actually been removed from the rigidified material and under certain conditions the aqueous liquid could be desorbed subsequently and this could risk re-fluidisation of the waste material, with the inevitable risk of destabilising the stack.

WO-A-96/05146 describes a process of stacking an aqueous slurry of particulate solids which comprises admixing an emulsion of a water-soluble polymer dispersed in a continuous oil phase with the slurry. Preference is given to diluting the emulsion polymer with a diluent, and which is preferably in a hydrocarbon liquid or gas and which will not invert the emulsion. Therefore it is a requirement of the process that the polymer is not added in to the slurry as an aqueous solution. There is no disclosure that dewatering and rigidification can be achieved sufficient to form stacks of the mineral material by the addition of an aqueous solution of polymer.

WO-A-0192167 describes a process where a material comprising a suspension of particulate solids is pumped as a fluid and then allowed to stand and rigidify. The rigidification is achieved by introducing into the suspension particles of a water soluble polymer which has an intrinsic viscosity of at least 3 dl/g. This treatment enables the material to retain its fluidity whilst being pumped, but upon standing causes the material to rigidify. This process has the benefit that the concentrated solids can be easily stacked, which minimises the area of land required for disposal. The process also has the advantage over the use of cross linked water absorbent polymers in that water from the suspension is released rather than being absorbed and retained by the polymer. The importance of using particles of water soluble polymer is emphasised and it is stated that the use of aqueous solutions of the dissolved polymer would be ineffective. Very efficient release of water and convenient storage of the waste solids is achieved by this process, especially when applied to a red mud underflow from the Bayer alumina process.

WO-A-2004/060819 describes a process in which material comprising an aqueous liquid with dispersed particulate solids is transferred as a fluid to a deposition area, then allowed to stand and rigidify, and in which rigidification is improved whilst retaining the fluidity of the material during transfer, by combining with the material an effective rigidifying amount of an aqueous solution of a water-soluble polymer. Also described is a process in which dewatering of the particulate solids is achieved.

WO-A-0192167 and WO-A-2004/060819 each suggest that the respective polymers can be natural although preference is given to synthetic polymers.

EP-A-905091 describes a flocculation/coagulation process in which a feed slurry is treated before entering the thickener. The process involves the use of starch and a cationic coagulant in order to improve the clarity of the overflow from the thickener.

WO 02/083258 describes a standard solids liquid separation process involving a cationic polymer and non-ionic polymer in order to improve dewatering in a filtration and/or centrifugation system.

In the case of oil sands processing, the ore is processed to recover the bitumen fraction, and the remainder, including both process material and the gangue, constitutes the tailings that are not valuable and are to be disposed of. In oil sands processing, the main process material is water, and the gangue is mostly sand with some silt and clay. Physically, the tailings consist of a solid part (sand tailings) and a more or less fluid part (sludge). The most satisfactory place to dispose of these tailings would be in the existing excavated hole in the ground. Nevertheless the sand and the sludge components would occupy a larger volume than the ore from which it was processed.

In the process for recovery of heavy oil and bitumen from oil sand deposits, when using open cast mining, the oil or bitumen is extracted either by a hot-water process in which oil sands are mixed with 65° C. (150° F.) water and caustic or by a low-energy extraction process run at lower temperatures without caustic. However, both processes generate large volumes of tailings which consist of the whole oil sand ore body plus net additions of process water less only the recovered bitumen product.

These oil sand tailings can be subdivided into three categories; viz.: (1) screen oversize, (2) coarse or sand tailings (the fraction that settles rapidly), and (3) fine or tailings sludge (the fraction that settles slowly). Thus the oil sands tailing are made up of particles of different sizes.

Typically these oil sand tailings are piped to a tailings pond for disposal. The coarse sands settle first with fine particles settling only very slowly. These fine particles form highly stable fines suspensions in water containing as much as about 30 percent by weight solids. Over time these fine particles settle to form a substantially solid clay sediment thus filling the lagoon and requiring the creation of new lagoons.

It is well known to concentrate these oil sand tailings in a thickener to give a higher density underflow and to recover some of the process water as mentioned above.

For example, Xu. Y et al, *Mining Engineering*, November 2003, p. 33-39 describes the addition of anionic flocculants to the oil sand tailings in the thickener before disposal. The underflow can be disposed of and/or subjected to further drying for subsequent disposal in an oil sand tailings stacking area.

It would be desirable to find improvements to the process of rigidification and in particular to improve the dose efficiency of the treatment chemical.

According to the present invention we provide a process in which a suspension comprising dispersed particulate material in an aqueous medium is transferred as a fluid to a deposition area, then allowed to stand and rigidify, and in which rigidification is improved whilst retaining the fluidity of the suspension during transfer, by combining with the suspension during transfer a rigidifying amount of a treatment system which comprises i) a water-soluble synthetic polymer and
ii) a water-soluble natural or seminatural polymer.

Unexpectedly we have found that the present process provides the advantage of allowing the dose of synthetic polymer to be reduced. In some cases we find that effective results can be achieved with a reduced overall polymer dose which could not be achieved using either synthetic polymer or natural/seminatural polymer alone.

The synthetic polymer may consist wholly or partially of water-soluble polymer. Thus the polymer may comprise a blend of cross-linked synthetic polymer and water soluble synthetic polymer, provided sufficient of the synthetic polymer is water-soluble or behaves as though it is water-soluble to bring about dewatering on standing. The synthetic polymer may be in substantially dry particulate form but preferably is added as an aqueous solution.

The synthetic polymer may be a physical blend of swellable polymer and soluble polymer or alternatively is a lightly cross-linked polymer for instance as described in EP202780. Although the synthetic polymeric particles may comprise some cross-linked polymer it is essential to the present invention that a significant amount of water soluble polymer is present. When the synthetic polymeric particles comprise some swellable polymer it is desirable that at least 80% of the polymer is water-soluble.

The synthetic polymer should comprise polymer which is wholly or at least substantially water soluble. It may be branched by the presence of branching agent, for instance as described in WO-A-9829604, for instance in claim 12, or alternatively the water soluble polymer is substantially linear.

Preferably the water soluble synthetic polymer is of moderate to high molecular weight. Desirably it will have an intrinsic viscosity of at least 3 dl/g (measured in 1 M NaCl at 25° C.) and generally at least 5 or 6 dl/g, although the polymer may be of significantly high molecular weight and exhibit an intrinsic viscosity of 25 dl/g or 30 dl/g or even higher. Preferably the polymer will have an intrinsic viscosity in the range of 8dl/g to 25 dl/g, more preferably 11 dl/g or 12 dl/g to 18 dl/g or 20 dl/g.

Intrinsic viscosity of polymers may be determined by preparing an aqueous solution of the polymer (0.5-1% w/w) based on the active content of the polymer. 2 g of this 0.5-1% polymer solution is diluted to 100 ml in a volumetric flask with 50 ml of 2M sodium chloride solution that is buffered to pH 7.0 (using 1.56 g sodium dihydrogen phosphate and 32.26 g disodium hydrogen phosphate per liter of deionised water) and the whole is diluted to the 100 ml mark with deionised water. The intrinsic viscosity of the polymers are measured using a Number 1 suspended level viscometer at 25° C. in 1M buffered salt solution.

The water soluble synthetic polymer may be cationic, non-ionic, amphoteric, or anionic. The synthetic polymers are may be formed from any suitable water-soluble monomers. Typically the water soluble monomers have a solubility in water of at least 5 g/100 cc at 25° C. Preferred polymers are either non-ionic or anionic and formed from one or more ethylenically unsaturated monomers. When the polymer is non-ionic it will be formed from one or more non-ionic monomers, for instance selected from the group consisting of (meth) acrylamide, hydroxy alkyl esters of (meth) acrylic acid and N-vinyl pyrrolidone. Typically the anionic polymers are formed from one or more and ionic monomers optionally in combination with one or more and ionic monomers. Particularly preferred anionic polymers are formed from monomers selected from ethylenically unsaturated carboxylic acid and sulphonic acid monomers, preferably selected from (meth) acrylic acid, allyl sulphonic acid and 2-acrylamido-2-methyl propane sulphonic acid, and their salts, optionally in combination with non-ionic co-monomers, preferably selected from (meth) acrylamide, hydroxy alkyl esters of (meth) acrylic acid and N-vinyl pyrrolidone.

Especially preferred anionic polymers include the homopolymer of acrylamide or a copolymer of acrylamide with sodium acrylate.

It may be desirable to use synthetic cationic polymers in accordance with the present invention. Suitable cationic polymers can be formed from ethylenically unsaturated monomers selected from dimethyl amino ethyl (meth) acrylate-methyl chloride, (DMAEA.MeCl) quat, diallyl dimethyl ammonium chloride (DADMAC), trimethyl amino propyl (meth) acrylamide chloride (ATPAC) optionally in combination with non-ionic co-monomers, preferably selected from (meth) acrylamide, hydroxy alkyl esters of (meth) acrylic acid and N-vinyl pyrrolidone.

In some instances, it has been found advantageous to separately add combinations of synthetic polymer types. Thus an aqueous solution of an anionic, cationic or non-ionic polymer may be added to the above mentioned material first, followed by a second dose of either a similar or different water soluble synthetic polymer of any type.

In the invention, the water soluble synthetic polymer may be formed by any suitable polymerisation process. The polymers may be prepared for instance as gel polymers by solution polymerisation, water-in-oil suspension polymerisation or by water-in-oil emulsion polymerisation. When preparing gel polymers by solution polymerisation the initiators are generally introduced into the monomer solution.

Optionally a thermal initiator system may be included. Typically a thermal initiator would include any suitable initiator compound that releases radicals at an elevated temperature, for instance azo compounds, such as azo-bis-isobutyronitrile. The temperature during polymerisation should rise to at least 70° C. but preferably below 95° C. Alternatively polymerisation may be effected by irradiation (ultra violet light, microwave energy, heat etc.) optionally also using suitable radiation initiators. Once the polymerisation is complete and the polymer gel has been allowed to cool sufficiently the gel can be processed in a standard way by first comminuting the gel into smaller pieces, drying to the substantially dehydrated polymer followed by grinding to a powder. Alternatively polymer gels may be supplied in the form of polymer gels, for instance as gel polymer logs.

Such polymer gels may be prepared by suitable polymerisation techniques as described above, for instance by irradiation. The gels may be chopped to an appropriate size as required and then on application mixed with the material as partially hydrated water soluble polymer particles.

The polymers may be produced as beads by suspension polymerisation or as a water-in-oil emulsion or dispersion by water-in-oil emulsion polymerisation, for example according to a process defined by EP-A-150933, EP-A-102760 or EP-A-126528.

Alternatively the water soluble synthetic polymer may be provided as a dispersion in an aqueous medium. This may for instance be a dispersion of polymer particles of at least 20 microns in an aqueous medium containing an equilibrating agent as given in EP-A-170394. This may for example also include aqueous dispersions of polymer particles prepared by the polymerisation of aqueous monomers in the presence of an aqueous medium containing dissolved low IV polymers such as poly diallyl dimethyl ammonium chloride and optionally other dissolved materials for instance electrolyte and/or multi-hydroxy compounds e. g. polyalkylene glycols, as given in WO-A-9831749 or WO-A-9831748.

The aqueous solution of water-soluble synthetic polymer is typically obtained by dissolving the polymer in water or by diluting a more concentrated solution of the polymer. Generally solid particulate polymer, for instance in the form of powder or beads, is dispersed in water and allowed to dissolve with agitation. This may be achieved using conventional make up equipment. Desirably, the polymer solution can be prepared using the Auto Jet Wet (trademark) supplied by Ciba Specialty Chemicals. Alternatively, the synthetic polymer may be supplied in the form of a reverse phase emulsion or dispersion which can then be inverted into water.

Where the synthetic polymer is added as an aqueous solution it may be added in any suitable concentration. It may be desirable to employ a relatively concentrated solution, for instance up to 10% or more based on weight of polymer in order to minimise the amount of water introduced into the material. Usually though it will be desirable to add the polymer solution at a lower concentration to minimise problems resulting from the high viscosity of the polymer solution and to facilitate distribution of the polymer throughout the material. The polymer solution can be added at a relatively dilute concentration, for instance as low as 0.01% by weight of polymer. Typically the polymer solution will normally be used at a concentration between 0.05 and 5% by weight of polymer. Preferably the polymer concentration will be the range 0.1% to 2 or 3%. More preferably the concentration will range from 0.25% or 0.5% to about 1 or 1.5%.

The water soluble natural or seminatural polymer may be any suitable naturally derived polymer or seminatural polymer. By seminatural polymer we mean that the polymer has been naturally derived and then post modified, for instance to render it cationic or anionic. The natural polymer can be for instance polysaccharides such as starch such as Tapioca Starch, Guar Gum, Xanthan Gum, Diutan Gum Welan Gum, Dextran, Dextran syrup, Rhansan Gum or a semi-natural polymer such as modified starch, chitosan, MHPC, MHEC, D.S 0.92, D.S 0.59, D.S 1.24, wheat starch cooked, anionic starch, cooked caustic starch, sodium alginate, carboxymethyl cellulose or hydroxyethyl cellulose.

Particularly effective results are achieved when the natural or seminatural polymer is based on cellulose, preferably carboxy methyl cellulose.

The synthetic polymer and the natural or seminatural polymer may be added to the suspension of particulate material sequentially or simultaneously. When they are added sequentially it may be desirable for certain substrates to add the synthetic polymer first although in some instances it may be preferable to add the natural or seminatural polymer first. In some cases simultaneous addition of the synthetic and natural or seminatural polymers may produced more desirable effects. This may be achieved by addition of the polymers separately but substantially at the same time alternatively by adding the two polymers in combination e.g. as a mixture.

Suitable doses of synthetic polymer and natural or seminatural polymer each range from 10 grams to 10,000 grams per tonne of material solids. The doses of polymer are based on active polymer per dry solids of the suspension. Generally the appropriate dose can vary according to the particular material and material solids content. Preferred doses are in the range 30 to 3,000 grams per tonne, more preferably 30 to 1000 grams per tonne, while even more preferred doses are in the range of from 60 to 200 or 400 grams per tonne. The two polymers may be added to the suspension of particulate material, such as mineral material e.g. the tailings slurry, in solid particulate form alternatively as an aqueous solution that has been prepared by dissolving either or both of the two polymers into water or an aqueous medium.

For certain combinations of polymer and for certain substrates we have found that the overall dose of total polymer used is significantly less to achieve appropriate rigidification than can be achieved by the use of each polymer component alone. In this case the overall total polymer dosage may be less than 300 grams per tonne, preferably less than 250 grams per tonne, especially below 200 grams per tonne, for instance in the range of 100 to 150 or 200 grams per tonne. In other instances we have found that the amount of the more expensive synthetic polymer component can be significantly reduced even though the amount of less expensive natural or seminatural polymer is high. In this case the synthetic polymer component may be added at less than 250 grams per tonne and often below 200 or 150 grams per tonne even if the natural or seminatural polymer is added at a higher dose of at least 250 grams per tonne. In some cases the natural or seminatural polymer may be added at doses in excess of 500 or 1000 grams per tonne and is certain cases beneficial results may be achieved by significantly higher doses of at least 2000 and even greater than 3000 or 4000 grams per tonne.

In addition we have found that the combination of synthetic and natural or seminatural polymer can produce a dewatering in which the liquor released has a higher clarity than can be achieved using the individual polymer components alone.

Generally suspended solids may be concentrated in a thickener and this material will for instance leave the thickener as an underflow which will be pumped along a conduit to a deposition area. The conduit can be any convenient means for transferring the material to the deposition area and may for instance be a pipe or a trench. The material remains fluid and pumpable during the transfer stage until the material is allowed to stand and rigidify.

Desirably the process of the invention is part of the mineral processing operation in which an aqueous suspension of waste solids is optionally flocculated in a vessel to form a supernatant layer comprising an aqueous liquor and an underflow layer comprising thickened solids which form the material. The supernatant layer will be separated from the underflow in the vessel and typically recycled or subjected to further processing. The aqueous suspension of waste solids or optionally, the thickened underflow is transferred, usually by pumping, to a deposition area, which may for instance be a tailings dam or lagoon. The material may consist of only mainly fine particles, or a mixture of fine and coarse particles. Optionally, additional coarse particles may be combined with the aqueous suspension at any convenient point prior to discharge at the deposition area. Once the material has reached the deposition area it is allowed to stand and dewater and in addition preferably rigidification takes place. The polymer may be added to the material in an effective amount at any convenient point, typically during transfer. In some cases the aqueous suspension may be transferred first to a holding vessel before being transferred to the deposition area. After deposition of the suspension of particulate material it will rigidify and preferably dewater by releasing aqueous liquor to form a dewatered solid. Preferably the dewatered suspension of particulate mineral material will form a compact and dry solid mass through the combined actions of sedimentation, drainage and evaporative drying.

The mineral material particles are usually inorganic. Typically the material may be derived from or contain filter cake, tailings, thickener underflows, or unthickened plant waste streams, for instance other mineral tailings or slimes, including phosphate, diamond, gold slimes, mineral sands, tails from zinc, lead, copper, silver, uranium, nickel, iron ore processing, coal, oil sands or red mud. The material may be solids settled from the final thickener or wash stage of a mineral processing operation. Thus the material desirably results from a mineral processing operation. Preferably the material comprises tailings. Preferably the mineral material would be hydrophilic in nature and more preferably selected from red mud and tailings containing hydrophilic clay, such as oil sands tailings etc.

For clay mineral suspensions such as china clay, combinations of synthetic polymers for instance acrylamide and sodium acrylate with natural or semi natural polymers such as Guar Gum, sodium alginate, Dextran or cellulosic materials, preferably carboxylic methyl cellulose produce particularly effective results.

When the substrate is a coal tailings preferred combinations include synthetics with derivatives of cellulosic natural or seminatural polymers, particularly hydroxy methyl cellulose. Especially preferred combinations include copolymers of acrylamide with sodium acrylate and hydroxy methyl cellulose.

Suspensions of mineral sands or similar substrates exhibit particularly improved rigidification using combinations of synthetic polymer with any of Guar Gum or anionic starch especially when the combination comprises the synthetic polymer of sodium acrylate and acrylamide.

Any of Dextran, cellulosics especially hydroxy ethyl cellulose, starches in particular derivatised or modified starch e.g. anionic, non-ionic or cationic starch, Rhansan Gum in combination with synthetic polymers, for instance acrylamide/sodium acrylate copolymers provide particularly good results for red mud slurries derived from a Bayer alumina process.

The fine tailings or other material which is pumped may have a solids content in the range 10% to 80% by weight. The slurries are often in the range 20% to 70% by weight, for instance 45% to 65% by weight. The sizes of particles in a typical sample of the fine tailings are substantially all less than 25 microns, for instance about 95% by weight of material is particles less than 20 microns and about 75% is less than 10 microns. The coarse tailings are substantially greater than 100 microns, for instance about 85% is greater than 100 microns but generally less than 10,000 microns. The fine tailings and coarse tailings may be present or combined together in any convenient ratio provided that material remains pumpable.

The dispersed particulate solids may have a bimodal distribution of particle sizes. Typically this bimodal distribution may comprise a fine fraction and a coarse fraction, in which the fine fraction peak is substantially less than 25 microns and the coarse fraction peak is substantially greater than 75 microns.

We have found better results are obtained in terms of dewatering and rigidification when the material is relatively concentrated and homogenous. It may also be desirable to combine the addition of the polymer with other additives. For instance the flow properties of the material through a conduit may be facilitated by including a dispersant. Typically where a dispersant is included it would be included in conventional amounts. However, we have found that surprisingly the presence of dispersants or other additives does not impair the dewatering or rigidification. It may also be desirable to pre-treat the material with either an inorganic or organic coagulant to pre-coagulate the fine material to aid its retention in the dewatered particulate material.

In the present invention the suspension of particulate mineral material may typically be a waste material from a mineral processing operation.

When aqueous suspensions of fine and coarse particulate materials are being combined for the purposes of co-disposal, the effective dewatering and rigidifying amount of the water-soluble polymer solution will normally be added during or after the mixing of the different waste streams into a homogeneous slurry.

Typically the suspension of particulate mineral material may be transferred along a conduit and through an outlet to the deposition area. The suspension of particulate mineral material will then be allowed to dewater at the deposition area. Preferably the suspension of particulate material that has been transferred to the deposition area will also rigidify upon standing. In many cases the deposition area will already contain rigidified mineral material. Suitably the suspension of particulate mineral material upon reaching the deposition area will flow on the surface of previously rigidified mineral material and the material will be allowed to stand and rigidify to form a stack.

Typically the material will be pumped as a fluid to an outlet at the deposition area and the material allowed to flow over the surface of rigidified material. The material is allowed to stand and rigidify and therefore forming a stack of rigidified material. This process may be repeated several times to form a stack that comprises several layers of rigidified material. The formation of stacks of rigidified material has the advantage that less area is required for disposal.

In a mineral processing operation where a suspension containing solids is flocculated in a thickener in order to separate the suspension into a supernatant layer and an underflow material, the material can typically be treated at any suitable point after flocculation in the thickener but before the material is allowed to stand. Typically the suspension is transferred along a conduit to a deposition area. This is normally achieved by pumping the suspension of particulate mineral material. A suitable and effective dewatering and dust suppressing amount of the water-soluble polymer can be mixed with the material prior to or during a pumping stage. In this way the polymer can be distributed throughout the material.

Alternatively, the polymer can be introduced and mixed with the material subsequently to a pumping stage. The most effective point of addition will depend upon the substrate and the distance from the thickener to the deposition area. If the conduit is relatively short it may be advantageous to dose the polymer solution close to where the material flows from the thickener. On the other hand, where the deposition area is significantly remote from the thickener in may be desirable to introduce the polymer solution closer to the outlet. In some instances in may be convenient to introduce the polymer solution into the material as it exits the outlet. Frequently it may be desirable to add the polymer to the suspension before it exits the outlet, preferably within 10 meters of the outlet.

The rheological characteristics of the material as it flows through the conduit to the deposition area is important, since any significant reduction in flow characteristics could seriously impair the efficiency of the process. It is important that there is no significant settling of the solids as this could result in a blockage, which may mean that the plant has to be closed to allow the blockage to be cleared. In addition it is important that there is no significant reduction in flow characteristics, since this could drastically impair the pumpability on the material. Such a deleterious effect could result in significantly increased energy costs as pumping becomes harder and the likelihood of increased wear on the pumping equipment.

The rheological characteristics of the suspension of particulate mineral material as it dewaters is important, since once the material is allowed to stand it is important that flow is minimised and that ideally solidification and preferably rigidification of the material proceeds rapidly. If the material is too fluid then it will not form an effective stack and there is also a risk that it will contaminate water released from the material. It is also desirable that the rigidified material is sufficiently strong to remain intact and withstand the weight of subsequent layers of rigidified material being applied to it.

Preferably the process of the invention will achieve a heaped disposal geometry and will co-immobilise the fine and course fractions of the solids in the material and also allowing any released water to have a higher driving force to separate it from the material by virtue of hydraulic gravity drainage. The heaped geometry appears to give a higher downward compaction pressure on underlying solids which seems to be responsible for enhancing the rate of dewatering. We find that this geometry results in a greater amount of waste per surface area, which is both environmentally and economically beneficial.

It is not possible to achieve the objectives of the invention by adapting the flocculation step in the thickener. For instance flocculation of the suspension in the thickener to provide an underflow sufficiently concentrated such that it would stack would be of a little value since it would not be possible to pump such a concentrated underflow. Furthermore adding polymer into the thickener would not achieve the desired effect of improving suppression of the dewatered mineral material. Instead we have found that it is essential to treat the material that has been formed as an underflow in the thickener. It appears that separately treating the thickened solids in the underflow allows the material to rigidify effectively without compromising the fluidity during transfer.

A preferred feature of the present invention is the rigidification during the release of aqueous liquor that preferably occurs during the dewatering step. Thus in a preferred form of the invention the material is dewatered during rigidification to release liquor containing significantly less solids. The liquor can then be returned to the process thus reducing the volume of imported water required and therefore it is important that the liquor is clear and substantially free of contaminants, especially migrating particulate fines. Suitably the liquor may for instance be recycled to the thickener from which the material was separated as an underflow. Alternatively, the liquor can be recycled to the spirals or other processes within the same plant.

Figure 1:
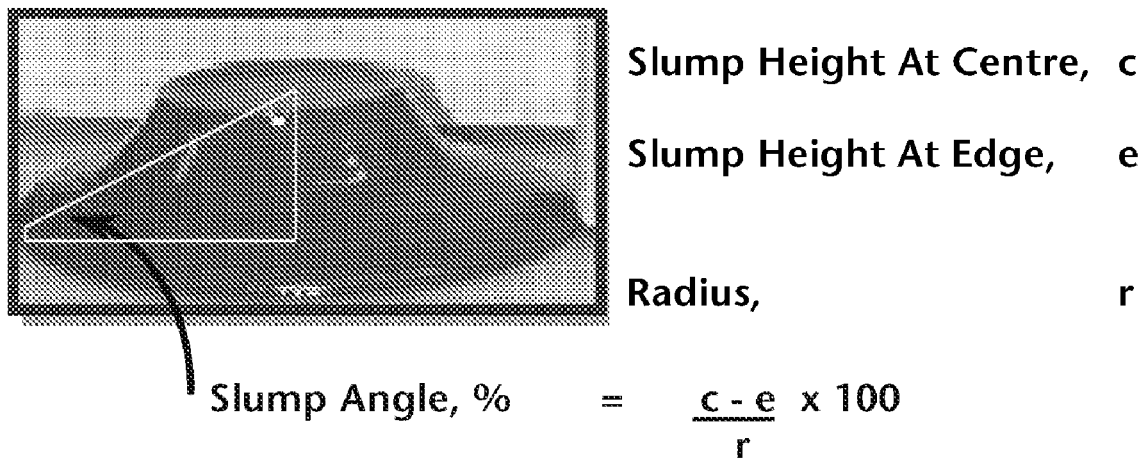
FIG. 1 shows a slump angle calculation.

The following examples illustrate the invention.

EXAMPLES

TABLE 1

Polymers Used in the Examples

| Sample | Composition | Molecular Weight | Ionicity |
|---|---|---|---|
| Sample 1 | 50:50 NaAcrylate:Acrylamide Copolymer | 19,000,000 | Anionic |
| Sample 2 | Xanthan Gum | 9,000,000 | Anionic |
| Sample 3 | Welan Gum | | Non-ionic |
| Sample 4 | Carboxy Methyl Cellulose | 50,000 | Anionic |

TABLE 1-continued

Polymers Used in the Examples

| Sample | Composition | Molecular Weight | Ionicity |
|---|---|---|---|
| Sample 5 | Guar Gum 64 | 1,000,000 | Non-ionic |
| Sample 6 | Guar Gum 66 | 1,000,000 | Non-ionic |
| Sample 7 | Dextran | 5-40,000,000 | Non-ionic |
| Sample 8 | Modified Starch | | Anionic |
| Sample 9 | Modified Starch | | Non-ionic |
| Sample 10 | Modified Starch | | Cationic |
| Sample 11 | Diutan Gum | | Non-ionic |
| Sample 12 | Chitosan | | Cationic |
| Sample 13 | 50:50 NaAc:ACM Copolymer | 6,000,000 | Anionic |
| Sample 14 | Methyl HydroxyPropylCellulose | 20,000 | Non-ionic |
| Sample 15 | Methyl HydroxyEthylCellulose | 35,000 | Non-ionic |
| Sample 16 | Methyl Cellulose | 7,000 | Non-ionic |
| Sample 17 | Carboxy Methyl Cellulose D.S 0.92 | 50,000 | Anionic |
| Sample 18 | Carboxy Methyl Cellulose D.S 0.59 | 50,000 | Anionic |
| Sample 19 | Carboxy Methyl Cellulose D.S 1.24 | 2,000 | Anionic |
| Sample 20 | Sodium Alginate | | Anionic |
| Sample 21 | Guar Gum | | Non-ionic |
| Sample 22 | 10:90 NaAcrylate:Acrylamide Copolymer Copolymer | 15,000,000 | Anionic |
| Sample 23 | 30:70 NaAcrylate:Acrylamide Copolymer Copolymer | 19,000,000 | Anionic |
| Sample 24 | 75:25 NaAcrylate:Acrylamide Copolymer Copolymer | 15,000,000 | Anionic |
| Sample 25 | Dextran Syrup | | |
| Sample 26 | 30:70 NaAcrylate:Acrylamide Copolymer Copolymer | 15,000,000 | Anionic |
| Sample 27 | Rhansan Gum | | |
| Sample 28 | Wheat Starch Cooked | | |
| Sample 29 | Tapioca Starch | 50000 | Non-ionic |
| Sample 30 | Tapioca Starch | 50000 | Non-ionic |
| Sample 31 | Tapioca Starch | | Cationic |
| Sample 32 | Tapioca Starch | | Cationic |
| Sample 33 | Tapioca Starch | | Cationic |
| Sample 34 | Tapioca Starch | | Cationic |
| Sample 35 | Tapioca Starch | | Cationic |
| Sample 36 | Modified Starch | | Cationic |
| Sample 37 | Anionic starch DS = 2 | | Anionic |
| Sample 38 | Anionic starch DS = 0.9 | | Anionic |
| Sample 39 | Anionic starch DS = 2.75 | | Anionic |
| Sample 40 | Hydroxy methyl cellulose | | Non-ionic |
| Sample 41 | Hydroxy methyl cellulose | | Non-ionic |
| Sample 42 | Cooked Caustic Starch | | Non-ionic |

Sample Preparation

Samples 1 & 13—Preparation of Aqueous Solutions of Solid Grade Polymers

Mix the solid polymer sample to ensure it is homogeneous. Weigh accurately the required weight of polymer into a clean dry 8 oz bottle. Add the required volume of acetone from a dispenser and gently swirl to wet all the polymer. Add the required volume of de-ionised water from a dispenser. Screw on the top and shake vigorously until the polymer is fully dispersed throughout the solution and has swelled sufficiently to prevent the polymer from either sticking together or sticking to the bottle sides. If the polymer agglomerates or sticks to the bottle the whole preparation procedure must be repeated. Fasten the jar securely on a tumbler and tumble for the required dissolution time.

Samples 2-11 & 14-20—Vortex Mixing Of Solutions Of Polymers

1. Set the stirrer motor speed to zero or the lowest possible rate.
2. Weigh the makeup water into the makeup vessel.
3. Weigh the polymer required into the container used, to an accuracy of ±0.01 g or 1% whichever is greater.
4. Place the makeup vessel, containing the water, under the stirrer motor and secure it in place.
5. Select and install a suitable stirrer.
6. Switch on the stirrer motor and gradually increase the stirring speed until a vortex is formed which stops about 1 blade's thickness above the top of the stirrer blade.
7. Gently sprinkle the polymer onto the shoulder of the vortex at a steady rate.
8. Once the particles have been thoroughly wet out and a solution viscosity has developed (noticeable by a lessening in the degree of splashing around the vortex) the stirrer speed is reduced so the vortex is at a minimum for efficient stirring as seen from continuous movement of the whole solution.
9. The solution is left stirring at this speed until the polymer is fully dissolved (normally 2 hours in the laboratory). Once this time has elapsed the polymer solution is ready for use.

Sample 12 is made up as a 1% solution in 0.2 M acetic acid by vortex mixing as above. The solution is then diluted to 0.25% with deionised water prior to testing.

Example 1

A solution of Sample 1 is prepared as a 0.5% w/w stock solution and further diluted to a 0.25% w/w solution prior to use.

280 ml aliquots of a 3:7 w/w dry solids slurry of 20% w/v china clay and sand is utilised for each test. The sand is pre-dried at 110° C. and screened at 500±90 μm particle size before use. This combination of china clay and sand is used as it represents a typical mine waste comprising a fine clay substrate in combination with courser particles.

A slump site is prepared by placing a rigid collar of 63 mm height and diameter onto a paint roller tray, lined with a sheet of coarse sand paper.

Diluted Sample 1 is added to the slurry at several doses and distributed via a range of beaker pours.

The collar is filled to the brim with the treated slurry and levelled off.

The collar is removed vertically off the tray, at speed, allowing the slurry to slump outwards and placed to one side to avoid excess slurry to drop onto the slump.

A stopwatch is started immediately after the formation of the slump.

The diameter and height at both the edge and centre of the resultant slump are recorded.

Once the slump dimensions have been recorded, the paint tray is inclined one inch to allow effective run off and collection of the free liquor in the trough of the paint tray.

The free liquor is collected via a syringe after 10 minutes, then transferred to a pre-weighed bottle for quantification.

The water quality is measured on a turbidity meter.

The slump angle is calculated using the following calculation:

$$\text{slump angle, } \% = \frac{c-e}{r} \times 100$$

Where c is slump height at centre, e is slump height at edge and r is the radius of the slump. This is shown in FIG. 1.

Results

TABLE 2

| Sample 1 Dose, g/t | Mixing Details | Slump Angle % | Water recovery, % | Water Quality, NTU |
|---|---|---|---|---|
| 100 | 10 | 2.0 | 1.0 | 14 |
| 150 | 10 | 4.5 | 2.0 | 109 |
| 200 | 10 | 14.7 | 4.0 | 58 |
| 250 | 10 | 20.2 | 7.6 | 65 |
| 300 | 10 | 20.0 | 8.6 | 23 |
| 350 | 10 | 21.9 | 8.3 | 65 |
| 400 | 10 | 9.2 | 6.7 | 54 |
| 100 | 20 | 1.3 | 2.0 | 12 |
| 150 | 20 | 5.3 | 6.3 | 215 |
| 200 | 20 | 86.7 | 26.4 | 95 |
| 250 | 20 | 128.6 | 25.3 | 65 |
| 300 | 20 | 134.3 | 30.3 | 186 |
| 350 | 20 | 120.0 | 28.2 | 310 |
| 400 | 20 | 60.2 | 16.4 | 618 |
| 100 | 30 | 2.0 | 0.1 | Not enough volume |
| 150 | 30 | 8.8 | 9.5 | 580 |
| 200 | 30 | 87.0 | 30.2 | 88 |
| 250 | 30 | 103.4 | 30.5 | 32 |
| 300 | 30 | 141.7 | 30.8 | 115 |
| 350 | 30 | 133.3 | 31.9 | 313 |
| 400 | 30 | 106.7 | 29.3 | 568 |
| 100 | 40 | 0.7 | 0.2 | Not enough volume |
| 150 | 40 | 2.0 | 3.1 | Not enough volume |
| 200 | 40 | 6.0 | 11.1 | 180 |
| 250 | 40 | 106.7 | 42.7 | 17.5 |
| 300 | 40 | 153.8 | 44.1 | 11.6 |
| 350 | 40 | 200.0 | 45.7 | 13.5 |
| 400 | 40 | 181.3 | 38.2 | 16.3 |

These results show that a dose of 250-400 g/t Sample 1 and 20-40 beaker pours are required to give good Slump Angles, Water Recovery and Water Quality.

Example 2

A series of natural polymers are tested and compared against Sample 1 by the method described in Example 1.

Results

TABLE 3

| Treatment | Polymer Dose, g/t | Mixing Details | Slump Angle, % | Water recovery, % | Water Quality, NTU |
|---|---|---|---|---|---|
| Sample 1 | 150 | 40 | 2.7 | 3.1 | Not enough volume |
|  | 300 | 40 | 172.4 | 30.8 | 33.7 |
|  | 350 | 40 | 160.0 | 32.0 | 30.7 |
|  | 400 | 40 | 134.3 | 34.9 | 36.3 |
| Sample 2 | 652 | 10 | 0.7 | 0.3 | Not enough volume |
|  | 1304 | 10 | 1.3 | 0.7 | Not enough volume |
| Sample 3 | 490 | 10 | 0.7 | 0 | Not enough volume |
|  | 652 | 10 | 0.7 | 1.0 | Not enough volume |
|  | 978 | 10 | 2.0 | 0 | Not enough volume |
| Sample 4 | 490 | 10 | 0.7 | 0 | Not enough volume |
|  | 815 | 10 | 0.7 | 0 | Not enough volume |
| Sample 5 | 815 | 10 | 0.7 | 18.5 | 1000 |
| Sample 6 | 815 | 10 | 0.7 | 17.9 | 1000 |

TABLE 3-continued

| Treatment | Polymer Dose, g/t | Mixing Details | Slump Angle, % | Water recovery, % | Water Quality, NTU |
|---|---|---|---|---|---|
| Sample 7 | 815 | 10 | 0.7 | 0.3 | Not enough volume |
| Sample 8 | 815 | 10 | 0.7 | 0 | Not enough volume |
| Sample 9 | 815 | 10 | 0.7 | 0 | Not enough volume |
| Sample 10 | 815 | 10 | 0.7 | 0 | Not enough volume |
| Sample 11 | 815 | 10 | 0.7 | 0 | Not enough volume |
| Sample 12 | 815 | 10 | 3.58 | 3.2 | Not enough volume |

From the table of results it can be seen that even at a very high dose, none of the natural polymers form a slump. There is also very little water release. A maximum of 10 beaker pours are carried out because the structure deteriorates with more.

Example 3

As many of the natural polymers in Example 2 have much lower molecular weights than Sample 1, the lower molecular weight synthetic polymer Sample 13 is tested as per Example 1 to see if it gives the same effect.

Results

TABLE 4

| Sample 13 Dose, g/t | Mixing Details | Slump Angle, % | Water recovery, % | Water Quality, NTU |
|---|---|---|---|---|
| 100 | 10 | 3.0 | 3.3 | 177 |
| 150 | 10 | 17.6 | 27.4 | 549 |
| 200 | 10 | 117.9 | 36.0 | 19.5 |
| 250 | 10 | 119.4 | 34.8 | 37.8 |
| 300 | 10 | 128.2 | 36.7 | 104 |
| 350 | 10 | 125.0 | 32.3 | 181 |
| 400 | 10 | 148.6 | 34.9 | 156 |
| 100 | 20 | 9.8 | 7.4 | 973 |
| 150 | 20 | 3.6 | 9.9 | 540 |
| 200 | 20 | 25.6 | 32.1 | 88.8 |
| 250 | 20 | 140.5 | 32.3 | 173 |
| 300 | 20 | 138.2 | 33.7 | 199 |
| 350 | 20 | 123.7 | 33.2 | 223 |
| 400 | 20 | 107.7 | 33.9 | 227 |
| 100 | 30 | 0.6 | 3.7 | 181 |
| 150 | 30 | 9.9 | 28.5 | 86.5 |
| 200 | 30 | 144.9 | 39.2 | 91.5 |
| 250 | 30 | 158.7 | 35.4 | 146 |
| 300 | 30 | 135.1 | 33.7 | 145 |
| 350 | 30 | 173.3 | 38.9 | 113 |
| 400 | 30 | 146.7 | 36.1 | 127 |
| 100 | 40 | 4.4 | 1.3 | Not enough volume |
| 150 | 40 | 3.4 | 13.5 | 456 |
| 200 | 40 | 177.8 | 35.8 | 54 |
| 250 | 40 | 140.8 | 34.1 | 97.1 |
| 300 | 40 | 148.6 | 32.5 | 150 |
| 350 | 40 | 2.6 | 36.4 | 282 |
| 400 | 40 | 14.3 | 22.7 | 200 |

Sample 13 gives good Slump Angles and Water Recovery over a range of beaker pours at doses of >200 g/t. The results are slightly improved on Sample 1 but the Water Quality is worse. The results do not indicate that lower molecular weight polymers are necessarily less effective.

Example 4

Several natural polymers are combined with Sample 1 in succession at 200:100 g/t and 100:50 g/t Sample 1:Natural Polymer and tested as per Example 1. Thirty beaker pours are used in each test.

Results

TABLE 5

| Treatment | Polymer Dose, g/t | Mixing Details | Slump Angle, % | Water recovery, % | Water Quality, NTU |
|---|---|---|---|---|---|
| Sample 1 | 200 | 30 | 129.7 | 37.8 | 32.0 |
|  | 250 | 30 | 171.4 | 36.2 | 36.1 |
|  | 300 | 30 | 165.1 | 39.4 | 52.3 |
| Sample 1/Sample 4 | 200/100 | 30 | 142.9 | 36.9 | 44.0 |
| Sample 1/Sample 5 | 200/100 | 30 | 144.1 | 39.3 | 29.6 |
| Sample 1/Sample 6 | 200/100 | 30 | 141.2 | 41.3 | 29.6 |
| Sample 1/Sample 7 | 200/100 | 30 | 147.1 | 37.3 | 32.3 |

At the higher dose of 200:100 g/t Sample 1:natural polymer, the natural polymers behave in a similar way to Sample 1 on its own, giving good Slump Angles, Water Recovery and Water Quality.

TABLE 6

| Treatment | Polymer Dose, g/t | Mixing Details | Slump Angle, % | Water recovery, % | Water Quality, NTU |
|---|---|---|---|---|---|
| Sample 1 | 150 | 30 | 21.1 | 19.7 | 277 |
|  | 250 | 30 | 128.0 | 35.7 | 199 |
| Sample 1/Sample 4 | 100/50 | 30 | 119.5 | 33.4 | 40 |

At the lower dosage of 100:50 g/t Sample 1:Natural polymer Sample 4 gives a significantly improved result compared with Sample 1 alone, at the same total dosage.

Example 5

Sample 4 is tested in combination with Sample 1 at 100:50 g/t, at various ratios and over a range of beaker pours as per Example 1.

Results

TABLE 7

| Treatment | Polymer Dose, g/t | Mixing Details | Slump Angle, % | Water recovery, % | Water Quality, NTU |
|---|---|---|---|---|---|
| Sample 1 | 150 | 10 | 4.5 | 0.6 | 109 |
|  |  | 20 | 5.3 | 5.3 | 215 |
|  |  | 30 | 8.9 | 6.5 | 580 |
|  |  | 40 | 2.0 | 0.8 | Not enough volume |
| Sample 1:Sample 4 | 75:75 | 10 | 40.4 | 17.7 | 95 |
|  |  | 20 | 95.0 | 33.5 | 56.2 |
|  |  | 30 | 76.1 | 31.4 | 44.0 |
|  |  | 40 | 18.7 | 22.0 | 80.0 |

TABLE 7-continued

| Treatment | Polymer Dose, g/t | Mixing Details | Slump Angle, % | Water recovery, % | Water Quality, NTU |
|---|---|---|---|---|---|
| Sample 1:Sample 4 | 50:100 | 10 | 34.5 | 23.5 | 83 |
| | | 20 | 69.8 | 28.9 | 46.8 |
| | | 30 | 21.4 | 26.3 | 51 |
| Sample 1:Sample 4 | 100:50 | 10 | 49.1 | 15.1 | 102 |
| | | 20 | 103.5 | 33.3 | 83 |
| | | 30 | 115.4 | 37.1 | 46.8 |
| | | 40 | 4.5 | 10.0 | 1000 |

As can be seen from the table, the combination of Sample 1:Sample 4 at a dose of 100:50g/t with 20-30 beaker pours gives the best results in terms of Slump Angle and Water Recovery. 30 beaker pours improve the Water Quality. Using a dose ratio of 75:75 g/t gives a slightly inferior result. In this way it appears that combination conditions can be optimized to maximize a synergistic effect.

Example 6

Evaluation of mixing of one polymer before the addition of the other.
The following combinations at a dose of 75:75 g/t are tested
Sample 1:Sample 4.
Sample 4:Sample 1
The first polymer is added to the substrate and mixed for a number of beaker pours before adding the second polymer and carrying out the same number of beaker pours as the first polymer.
i.e
5/5
10/10
15/15
20/20
The method for collecting the recovered water is changed for this piece of test work as it is difficult to remove all of the recovered water with a syringe. Instead of collecting the water via a syringe, the sandpaper is carefully lifted from the tray and put on one side while the water is poured into a pre-weighed 4 oz bottle. The rest of the method remains unchanged as per Example 1.
Results

TABLE 8

| Treatment | Polymer Dose, g/t | Mixing Details | Slump Angle, % | Water recovery, % | Water Quality, NTU |
|---|---|---|---|---|---|
| Sample 1 | 150 | 10 | 2.2 | 0 | Not enough volume |
| | | 20 | 21.6 | 26.0 | 448 |
| | | 30 | 10.5 | 9.5 | 1000 |
| | | 40 | 2.2 | 9.2 | 971 |
| Sample 1:Sample 4 | 75:75 | 5/5 | 10.3 | 7.1 | 146 |
| | | 10/10 | 8.8 | 30.2 | 174 |
| | | 15/15 | 9.9 | 11.1 | 226 |
| | | 20/20 | 11.5 | 11.8 | 144 |
| Sample 4:Sample 1 | 75:75 | 5/5 | 6.5 | 1.0 | Not enough volume |
| | | 10/10 | 11.1 | 11.8 | 41 |
| | | 15/15 | 85.4 | 28.0 | 18 |
| | | 20/20 | 102.6 | 36.0 | 54 |
| Sample 1:Sample 4 | 75:75 | 10 | 22.4 | 17.3 | 136 |
| | | 20 | 109.8 | 25.4 | 90 |
| | | 30 | 16.4 | 24.4 | 92 |
| | | 40 | 24.1 | 22.0 | 116 |

The results show that improvements in Slump Angle, Water Recovery and/or Water Quality can be gained by a combination treatment. Again it appears that combination conditions can be optimized to maximize a synergistic effect.

Example 7

As good results are obtained using a combination of Sample 1:Sample 4, it is decided to evaluate other cellulosics varying in ionic character and degree of substitution as well as non cellulosics of similar anionicity to Sample 4 to see if they give the same or an improved effect. The method described in Example 1 is used but water is recovered as in Example 6.
Results

TABLE 9

| Treatment | Polymer Dose, g/t | Mixing Details | Slump Angle (%) | Water Recovery (%) | Water Quality NTU |
|---|---|---|---|---|---|
| Sample 1 | 150 | 30 | 10.5 | 9.5 | 1000 |
| Sample 1:Sample 17 | 75:75 | 30 | 131.5 | 39.2 | 54 |
| Sample 1:Sample 18 | 75:75 | 30 | 78.2 | 35.8 | 41 |
| Sample 1:Sample 19 | 75:75 | 30 | 28.6 | 30.2 | 88 |
| Sample 1:Sample 20 | 75:75 | 30 | 13.8 | 30.5 | 109 |

The results show an improved result over Sample 1 alone with combinations with samples 17 to 20,
The cellulose variants indicate that the character of the polymer is influential in optimizing a synergistic treatment.
All of the above testwork has been evaluated on synthetic mine waste substrate. Examples 8-12 show test results obtained on substrates from industrial mining operations.

Example 8

Natural/Synthetic 50:50 dose
Various natural polymers are tested in combination with Sample 22 at 690:690 g/t on a coal tailings substrate (dry solids—36.3%) as per the method described in Example 1.
Results

TABLE 10

| Single Treatments | Polymer Dose (g/t) | Mixing Details | Slump Angle (%) | Water recovery (%) |
|---|---|---|---|---|
| Sample 22 | 0 | 10 | 1 | 25 |
| Sample 22 | 690 | 10 | 15 | 0 |
| Sample 22 | 1030 | 10 | 26 | 5 |
| Sample 22 | 1380 | 10 | 17 | 5.2 |
| Sample 22 | 1725 | 10 | 42 | 7.4 |
| Sample 22 | 2070 | 10 | 47 | 2.8 |
| Sample 21 | 1380 | 10 | 43 | 11 |
| Sample 2 | 1380 | 10 | 3 | 0 |
| Sample 25 | 1380 | 10 | 2 | 0 |
| Sample 40 | 1380 | 10 | 27 | 1.2 |
| Sample 41 | 1380 | 10 | 28 | 3.2 |
| Sample 10 | 1380 | 10 | 3 | 0 |
| Sample 8 | 1380 | 10 | 5 | 0 |
| Sample 36 | 1380 | 10 | 3 | 0 |
| Sample 9 | 1380 | 10 | 5 | 0 |
| Sample 27 | 1380 | 10 | 2 | 0 |
| Sample 28 | 1380 | 10 | 0 | 0 |
| Sample 29 | 1380 | 10 | 1 | 0 |
| Sample 30 | 1380 | 10 | 0 | 0 |
| Sample 31 | 1380 | 10 | 2 | 0 |
| Sample 32 | 1380 | 10 | 2 | 0 |
| Sample 33 | 1380 | 10 | 2 | 0 |

TABLE 10-continued

| Single Treatments | Polymer Dose (g/t) | Mixing Details | Slump Angle (%) | Water recovery (%) |
|---|---|---|---|---|
| Sample 34 | 1380 | 10 | 1 | 0 |
| Sample 35 | 1380 | 10 | 2 | 0 |
| Sample 4 | 1380 | 10 | 0 | 0 |
| Sample 42 | 1380 | 10 | 1 | 0 |
| Sample 37 | 1380 | 10 | 3 | 0 |
| Sample 38 | 1380 | 10 | 1 | 0 |
| Sample 39 | 1380 | 10 | 2 | 0 |

TABLE 11

| Combined treatments | Dose (g/t) | Mixing Details | Slump Angle (%) | Water recovery (%) |
|---|---|---|---|---|
| Sample 22 | 1380 | 10 | 17 | 5.2 |
| Sample 21 | 690 | 10 | 53 | 6.6 |
| Sample 22 | +690 | 10 | | |
| Sample 40 | 690 | 10 | 43 | 9.4 |
| Sample 22 | +690 | 10 | | |
| Sample 41 | 690 | 10 | 67 | 8.8 |
| Sample 22 | +690 | 10 | | |
| Sample 8 | 690 | 10 | 20 | 0.3 |
| Sample 22 | +690 | 10 | | |
| Sample 36 | 690 | 10 | 18 | 0.1 |
| Sample 22 | +690 | 10 | | |
| Sample 9 | 690 | 10 | 26 | 1 |
| Sample 22 | +690 | 10 | | |
| Sample 28 | 690 | 10 | 19 | 0 |
| Sample 22 | +690 | 10 | | |
| Sample 32 | 690 | 10 | 18 | 0.6 |
| Sample 22 | +690 | 10 | | |
| Sample 38 | 690 | 10 | 27 | 7.6 |
| Sample 22 | +690 | 10 | | |
| Sample 39 | 690 | 10 | 26 | 5.4 |
| Sample 22 | +690 | 10 | | |

At a 50:50 combination, Sample 21 and the Hydroxy methyl cellulose samples 40 and 41 show the most improved Slump Angle and Water Recovery for this substrate. The dose level of Sample 22 alone has to be increased to 1725 g/t to obtain similar results.

Example 9

The 5 best performing natural polymers are tested on the same coal tailings substrate as in example 8 at combination ratios 25:75 & 75:25 as per the method described in Example 1.

Results

TABLE 12

| Combined treatments | Polymer Dose (g/t) | Mixing Details | Slump Angle (%) | Water recovery (%) |
|---|---|---|---|---|
| Sample 22 | 1380 | 10 | 17 | 5.2 |
| Sample 21 | 345 | 10 | 34 | 5 |
| Sample 22 | +1035 | 10 | | |
| Sample 21 | 1035 | 10 | 45 | 8.6 |
| Sample 22 | +345 | 10 | | |
| Sample 40 | 345 | 10 | 46 | 8 |
| Sample 22 | +1035 | 10 | | |
| Sample 40 | 1035 | 10 | 54 | 7 |
| Sample 22 | +345 | 10 | | |
| Sample 41 | 345 | 10 | 51 | 5 |
| Sample 22 | +1035 | 10 | | |
| Sample 41 | 1035 | 10 | 41 | 4.2 |
| Sample 22 | +345 | 10 | | |
| Sample 31 | 345 | 10 | 24 | 2.8 |
| Sample 22 | +1035 | 10 | | |
| Sample 31 | 1035 | 10 | 3 | 0 |
| Sample 22 | +345 | 10 | | |
| Sample 42 | 345 | 10 | 36 | 5 |
| Sample 22 | +1035 | 10 | | |
| Sample 42 | 1035 | 10 | 7 | 0 |
| Sample 22 | +345 | 10 | | |

Generally a higher dose of the natural polymer combined with a lower dose of synthetic polymer results in much improved Slump Angles and Water Recovery compared to Sample 22 alone. It appears that combination conditions can be optimized to maximize a synergistic effect.

Example 10

Various natural polymers are tested in combination with Sample 26 at 10:10 g/t on mineral sands mining waste substrate (Sand solids—52.6% wt/wt, Slimes solids—27.8% wt/wt) as per the method described in Example 1.

Results

TABLE 13

| Single Treatments | Polymer Dose (g/t) | Mixing Details | Slump Angle (%) | Water recovery (%) |
|---|---|---|---|---|
| Sample 26 | 0 | 15 | 1 | 0 |
| Sample 26 | 15 | 15 | 3 | 12 |
| Sample 26 | 20 | 15 | 29 | 57 |
| Sample 26 | 25 | 15 | 37 | 42 |
| Sample 26 | 50 | 15 | 37 | 39 |
| Sample 26 | 125 | 15 | 74 | 18 |
| Sample 21 | 20 | 15 | 7 | 17 |
| Sample 2 | 20 | 15 | 4 | 5.2 |
| Sample 25 | 20 | 15 | 0 | 0 |
| Sample 40 | 20 | 15 | 0 | 0 |
| Sample 41 | 20 | 15 | 1 | 0 |
| Sample 10 | 20 | 15 | 1 | 0 |
| Sample 8 | 20 | 15 | 1 | 0 |
| Sample 36 | 20 | 15 | 1 | 0 |
| Sample 9 | 20 | 15 | 1 | 0 |
| Sample 27 | 20 | 15 | 6 | 12 |
| Sample 28 | 20 | 15 | 1 | 0.4 |
| Sample 29 | 20 | 15 | 1 | 0 |
| Sample 30 | 20 | 15 | 0 | 0 |
| Sample 31 | 20 | 15 | 1 | 0 |
| Sample 32 | 20 | 15 | 0 | 0 |
| Sample 33 | 20 | 15 | 1 | 0 |
| Sample 34 | 20 | 15 | 1 | 0 |

TABLE 13-continued

| Single Treatments | Polymer Dose (g/t) | Mixing Details | Slump Angle (%) | Water recovery (%) |
|---|---|---|---|---|
| Sample 35 | 20 | 15 | 1 | 0 |
| Sample 4 | 20 | 15 | 1 | 0 |
| Sample 42 | 20 | 15 | 1 | 0 |
| Sample 37 | 20 | 15 | 1 | 0 |
| Sample 38 | 20 | 15 | 1 | 0 |
| Sample 39 | 20 | 15 | 1 | 0 |

None of the natural products on their own give significant rigidity to the substrate. Poor slump angles and low water recoveries are observed compared to the synthetic polymer Sample 26 at an equivalent dosage.

The following combinations were evaluated at a 1:1 ratio with Sample 26 at a total dosage of 20 g/t

TABLE 14

| Combined treatments | Polymer Dose (g/t) | Mixing Details | Slump Angle (%) | Water recovery (%) |
|---|---|---|---|---|
| Sample 26 | 10 + 10 | 15 | 29 | 57 |
| Sample 21 | 10 | 15 | 42 | 57 |
| Sample 26 | +10 | 15 | | |
| Sample 37 | 10 | 15 | 56 | 47 |
| Sample 26 | +10 | 15 | | |
| Sample 38 | 10 | 15 | 49 | 45 |
| Sample 26 | +10 | 15 | | |
| Sample 39 | 10 | 15 | 45 | 45 |
| Sample 26 | +10 | 15 | | |

Samples 21, 37, 38 and 39 in combination with Sample 26 give significantly improved Slump Angles although the Water recovery remains similar or is slightly lower than Sample 26 on its own at 20 g/t.

Example 11

Evaluation at a Natural/synthetic polymer 50:50 dose combination. Various natural polymers are tested in combination with Sample 24 at 134:134 g/t on an Alumina red mud super thickener substrate (Dry Weight—46.73%) as per the method described in Example 1.

Results

TABLE 15

| Single Treatments | Polymer Dose (g/t) | Mixing Details | Slump Angle (%) | Water recovery (%) |
|---|---|---|---|---|
| Sample 24 | 0 | 25 | 9 | 0 |
| Sample 24 | 134 | 25 | 38 | 0 |
| Sample 24 | 268 | 25 | 28 | 0 |
| Sample 24 | 402 | 25 | 53 | 0 |
| Sample 24 | 536 | 25 | 35 | 0 |
| Sample 24 | 804 | 25 | 31 | 0 |
| Sample 21 | 268 | 25 | 8 | 0 |
| Sample 2 | 268 | 25 | 8 | 0 |
| Sample 25 | 268 | 25 | 6 | 0 |
| Sample 40 | 268 | 25 | 6 | 0 |
| Sample 41 | 268 | 25 | 6 | 0 |

TABLE 15-continued

| Single Treatments | Polymer Dose (g/t) | Mixing Details | Slump Angle (%) | Water recovery (%) |
|---|---|---|---|---|
| Sample 10 | 268 | 25 | 7 | 0 |
| Sample 8 | 268 | 25 | 9 | 0 |
| Sample 36 | 268 | 25 | 8 | 0 |
| Sample 9 | 268 | 25 | 6 | 0 |
| Sample 27 | 268 | 25 | 8 | 0 |
| Sample 28 | 268 | 25 | 11 | 0 |
| Sample 29 | 268 | 25 | 6 | 0 |
| Sample 30 | 268 | 25 | 5 | 0 |
| Sample 31 | 268 | 25 | 9 | 0 |
| Sample 32 | 268 | 25 | 6 | 0 |
| Sample 33 | 268 | 25 | 8 | 0 |
| Sample 34 | 268 | 25 | 5 | 0 |
| Sample 35 | 268 | 25 | 9 | 0 |
| Sample 4 | 268 | 25 | 6 | 0 |
| Sample 42 | 268 | 25 | 10 | 0 |
| Sample 37 | 268 | 25 | 8 | 0 |
| Sample 38 | 268 | 25 | 6 | 0 |
| Sample 39 | 268 | 25 | 6 | 0 |

All of the natural products give poor Slump Angles compared to Sample 24 alone at the same dose level. No synergistic effects are observed. Again, no water is released from the stack.

TABLE 16

| Combined treatments | Polymer Dose (g/t) | Mixing Details | Slump Angle (%) | Water recovery (%) |
|---|---|---|---|---|
| Sample 24 | 134 + 134 | 25 | 28 | 0 |
| Sample 25 | 134 | 25 | 43 | 0 |
| Sample 24 | 134 | 25 | | |
| Sample 40 | 134 | 25 | 43 | 0 |
| Sample 24 | 134 | 25 | | |
| Sample 41 | 134 | 25 | 33 | 0 |
| Sample 24 | 134 | 25 | | |
| Sample 10 | 134 | 25 | 37 | 0 |
| Sample 24 | 134 | 25 | | |
| Sample 8 | 134 | 25 | 32 | 0 |
| Sample 24 | 134 | 25 | | |
| Sample 9 | 134 | 25 | 40 | 0 |
| Sample 24 | 134 | 25 | | |
| Sample 27 | 134 | 25 | 32 | 0 |
| Sample 24 | 134 | 25 | | |
| Sample 28 | 134 | 25 | 37 | 0 |
| Sample 24 | 134 | 25 | | |
| Sample 29 | 134 | 25 | 38 | 0 |
| Sample 24 | 134 | 25 | | |
| Sample 31 | 134 | 25 | 40 | 0 |
| Sample 24 | 134 | 25 | | |
| Sample 32 | 134 | 25 | 41 | 0 |
| Sample 24 | 134 | 25 | | |

TABLE 16-continued

| Combined treatments | Polymer Dose (g/t) | Mixing Details | Slump Angle (%) | Water recovery (%) |
|---|---|---|---|---|
| Sample 33 | 134 | 25 | 58 | 0 |
| Sample 24 | 134 | 25 | | |
| Sample 34 | 134 | 25 | 37 | 0.1 |
| Sample 24 | 134 | 25 | | |
| Sample 35 | 134 | 25 | 37 | 0.2 |
| Sample 24 | 134 | 25 | | |
| Sample 42 | 134 | 25 | 37 | 0 |
| Sample 24 | 134 | 25 | | |
| Sample 37 | 134 | 25 | 41 | 0 |
| Sample 24 | 134 | 25 | | |
| Sample 38 | 134 | 25 | 32 | 0.1 |
| Sample 24 | 134 | 25 | | |

All of the natural products give a synergistic improvement at a combined dose of 268 g/t with the synthetic polymer compared to Sample 24 alone at the same dose level. There is no Water Release.

Example 12

Natural/synthetic 50:50 dose

Various natural polymers are tested in combination with Sample 24 at 469:469 g/t on the above Alumina red mud super thickener substrate diluted to 20% solids to represent situations at lower slurry concentrations, where water release is a requirement. The test method described in Example 1 is used.

Results

TABLE 17

| Single Treatments | Polymer Dose (g/t) | Mixing Details | Slump Angle (%) | Water recovery (%) |
|---|---|---|---|---|
| Sample 24 | 0 | 15 | 0 | 0 |
| Sample 24 | 625 | 15 | 0 | 0 |
| Sample 24 | 813 | 15 | 4 | 40 |
| Sample 24 | 938 | 15 | 16 | 49 |
| Sample 24 | 1063 | 15 | 29 | 61 |
| Sample 24 | 1250 | 15 | 29 | 61 |
| Sample 21 | 938 | 15 | 0 | 0 |
| Sample 2 | 938 | 15 | 1 | 0 |
| Sample 25 | 938 | 15 | 3 | 15 |
| Sample 40 | 938 | 15 | 1 | 0 |
| Sample 41 | 938 | 15 | 1 | 0 |
| Sample 10 | 938 | 15 | 1 | 0 |
| Sample 8 | 938 | 15 | 1 | 0 |
| Sample 36 | 938 | 15 | 0 | 0 |
| Sample 9 | 938 | 15 | 3 | 6.8 |
| Sample 27 | 938 | 15 | 12 | 36 |
| Sample 28 | 938 | 15 | 0 | 0 |
| Sample 29 | 938 | 15 | 1 | 0 |
| Sample 30 | 938 | 15 | 1 | 0 |
| Sample 31 | 938 | 15 | 1 | 0 |
| Sample 32 | 938 | 15 | 0 | 0 |
| Sample 33 | 938 | 15 | 12 | 0 |
| Sample 34 | 938 | 15 | 11 | 0 |
| Sample 35 | 938 | 15 | 01 | 0 |
| Sample 4 | 938 | 15 | 0 | 0 |
| Sample 42 | 938 | 15 | 1 | 0.6 |
| Sample 37 | 938 | 15 | 1 | 0 |
| Sample 38 | 938 | 15 | 0 | 0 |
| Sample 39 | 938 | 15 | 1 | 0 |

The natural polymers alone are much less effective than the synthetic polymer Sample 24 at an equivalent dosage.

TABLE 18

| Combined treatments | Polymer Dose (g/t) | Mixing Details | Slump Angle (%) | Water recovery (%) |
|---|---|---|---|---|
| Sample 24 | 469 + 469 | 15 | 16 | 49 |
| Sample 27 | 469 | 15 | 73 | 68 |
| Sample 24 | +469 | 15 | | |
| Sample 31 | 469 | 15 | 10 | 55 |
| Sample 24 | +469 | 15 | | |
| Sample 25 | 469 | 15 | 13 | 49 |
| Sample 24 | +469 | 15 | | |
| Sample 42 | 469 | 15 | 9 | 30 |
| Sample 24 | +469 | 15 | | |

Sample 27 shows a significant improvement in Slump Angle when applied as a 1:1 combination with the synthetic Sample 24 compared to either product applied alone The other combinations were then tested on the same Alumina red mud super thickener substrate diluted to 20% solids, but at other combination ratios of 25:75 & 75:25 with synthetic Sample 24.

Results

TABLE 19

| Test | Dose (g/t) | Mixing Details | Slump Angle (%) | Water recovery (%) |
|---|---|---|---|---|
| Sample 24 | 469 + 469 | 15 | 16 | 49 |
| Sample 31 | 235 | 15 | 22 | 68 |
| Sample 24 | +703 | 15 | | |
| Sample 31 | 703 | 15 | 1 | 2.4 |
| Sample 24 | +235 | 15 | | |
| Sample 27 | 235 | 15 | 62 | 75 |
| Sample 24 | +703 | 15 | | |
| Sample 27 | 703 | 15 | 44 | 73 |
| Sample 24 | +235 | 15 | | |
| Sample 25 | 235 | 15 | 29 | 77 |
| Sample 24 | +703 | 15 | | |
| Sample 25 | 703 | 15 | 11 | 79 |

TABLE 19-continued

| Test | Dose (g/t) | Mixing Details | Slump Angle (%) | Water recovery (%) |
|---|---|---|---|---|
| Sample 24 | +235 | 15 | | |
| Sample 42 | 235 | 15 | 17 | 70 |
| Sample 24 | +703 | 15 | | |
| Sample 42 | 703 | 15 | 1 | 1.8 |
| Sample 24 | +235 | 15 | | |

Again Sample 27 in combination with Sample 24 gives the best Slump Angle. Samples 31, 25 and 42 which did not achieve a synergistic improvement over either component alone at a dose ratio of 1:1 have shown a successful improvement at other combination ratios.

The invention claimed is:

1. A process in which a mineral suspension comprising dispersed particulate material in an aqueous medium is transferred as an underflow from a thickener to a deposition area, then allowed to stand and rigidify, and in which rigidification releases aqueous liquor and is improved whilst retaining the fluidity of the suspension during transfer, by combining with the suspension during transfer a rigidifying amount of a treatment system which comprises
   i) a water-soluble synthetic polymer and
   ii) a water-soluble natural or seminatural polymer wherein the water soluble synthetic polymer is either anionic or non-ionic, has an intrinsic viscosity of at least 3 dl/g, and is formed from an ethylenically unsaturated water-soluble monomer or blend of monomers, wherein the synthetic polymer is formed from monomer(s) selected from the group consisting of (meth)acrylic acid, allyl sulphonic acid and 2-acrylamido-2-methyl propane sulphonic acid as the free acids or salts thereof, optionally in combination with non-ionic co-monomers, selected from the group consisting of (meth)acrylamide, hydroxy alkyl esters of (meth)acrylic acid and N-vinyl pyrrolidone, and wherein the synthetic polymer and natural or seminatural polymer are each combined with the suspension at a dose of 10 grams to 10,000 grams per tonne of material solids.

2. A process according to claim 1 in which the natural or seminatural polymer is based on cellulose.

3. A process according to claim 1 in which the suspension of particulate material is a waste material from a mineral processing operation.

4. A process according to claim 1 in which the suspension of particulate material is derived from mineral processing operations and is selected from the group consisting of red mud from a Bayer alumina process, tailings from the extraction of base metals, tailings from the extraction of precious metals, tailings from the extraction of iron, tailings from the extraction of nickel, coal tailings, mineral and oil sands and coal fines.

5. A process according to claim 1 in which the particulate material is hydrophilic in nature.

6. A process according to claim 1 in which the suspension of particulate material is transferred along a conduit and through an outlet to the deposition area.

7. A process according to claim 1 in which the suspension of particulate material that has been transferred to the deposition area releases aqueous liquor upon standing.

8. A process according to claim 1 in which the suspension of particulate material upon reaching the deposition area flows over the surface of previously rigidified material, wherein the material is allowed to stand and rigidify to form a stack.

9. A process according to claim 1 in which the suspension of particulate material is transferred by pumping it through a conduit and the polymer is added subsequently to the pumping stage.

10. A process according to claim 1 in which the suspension of particulate material is transferred by pumping it through a conduit and polymer is added during or prior to the pumping stage.

11. A process according to claim 1 in which the suspension of particulate material is transferred through a conduit having an outlet wherein the polymer is added to the suspension as it exits the outlet.

12. A process according to claim 1 in which the suspension of particulate mineral material is transferred through a conduit having an outlet wherein the polymer is added to the suspension before it exits the outlet.

13. A process according to claim 1 in which the synthetic polymer and natural or seminatural polymer are added in aqueous solution.

14. A process according to claim 1 in which the synthetic polymer and natural or seminatural polymer are added in the form of particles.

* * * * *